(No Model.) 2 Sheets—Sheet 1.

A. H. OVERMAN.
VEHICLE WHEEL.

No. 388,068. Patented Aug. 21, 1888.

Witnesses:
Chas. B. Shumway
Bessie Johnson

Inventor.
Albert H. Overman.
By Geo. W. Seymour
Atty.

(No Model.)  2 Sheets—Sheet 2.

A. H. OVERMAN.
VEHICLE WHEEL.

No. 388,068.  Patented Aug. 21, 1888.

Witnesses:
Chas. B. Shumway
Bessie Johnson.

Inventor.
Albert H. Overman
By Geo. W. Seymour
Atty.

United States Patent Office.

ALBERT H. OVERMAN, OF CHICOPEE, MASSACHUSETTS.

VEHICLE-WHEEL.

SPECIFICATION forming part of Letters Patent No. 388,068, dated August 21, 1888.

Application filed December 19, 1884. Serial No. 150,727. (No model.)

*To all whom it may concern:*

Be it known that I, ALBERT H. OVERMAN, residing at Chicopee, in the county of Hampden and State of Massachusetts, have invented certain new and useful Improvements in Vehicle-Wheels; and I do declare the following to be a full, clear, and exact description of the same, reference being had to the accompanying drawings, which form a part of this specification.

My invention relates to an improvement in that class of vehicle-wheels having hollow rims, wire spokes, and flanged hubs, the object being to produce a wheel having a stiff rim, and such an arrangement of spokes as shall equalize the great strain in the wheel, avoid rattling, and enable the spokes to be readily removed and replaced independently and without disturbing the other spokes.

With these ends in view my invention consists in a wheel-rim composed of a body portion, the edges whereof are bent inward, and a tread located within such body portion and below the edges thereof, and having its edges bent to be embraced by the bent edges of the body portion.

My invention further consists in a vehicle-wheel having wire spokes alternately applied to the opposite faces of each of its flanges, so that each spoke will be entirely independent of every other spoke.

My invention further consists in certain details of construction, as will be hereinafter described, and pointed out in the claims.

Figure 1:
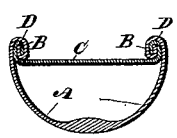
Figure 2:
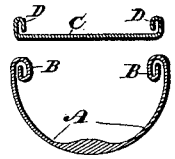
Figure 3:
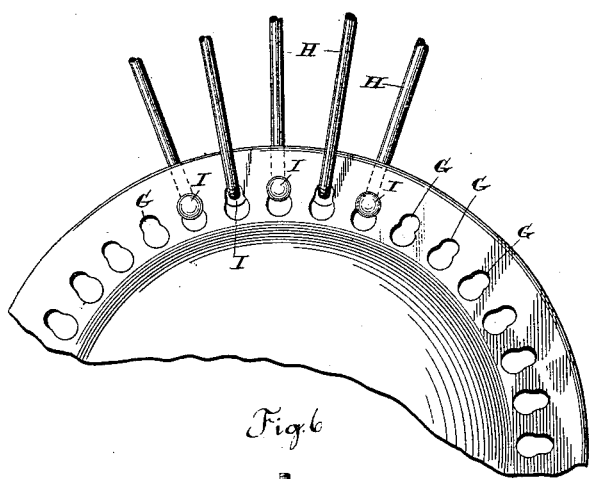
Figure 4:
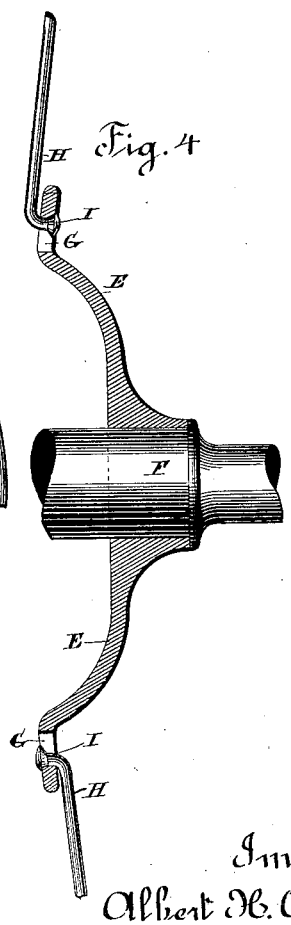
Figure 6:
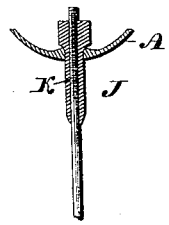
Figure 5:
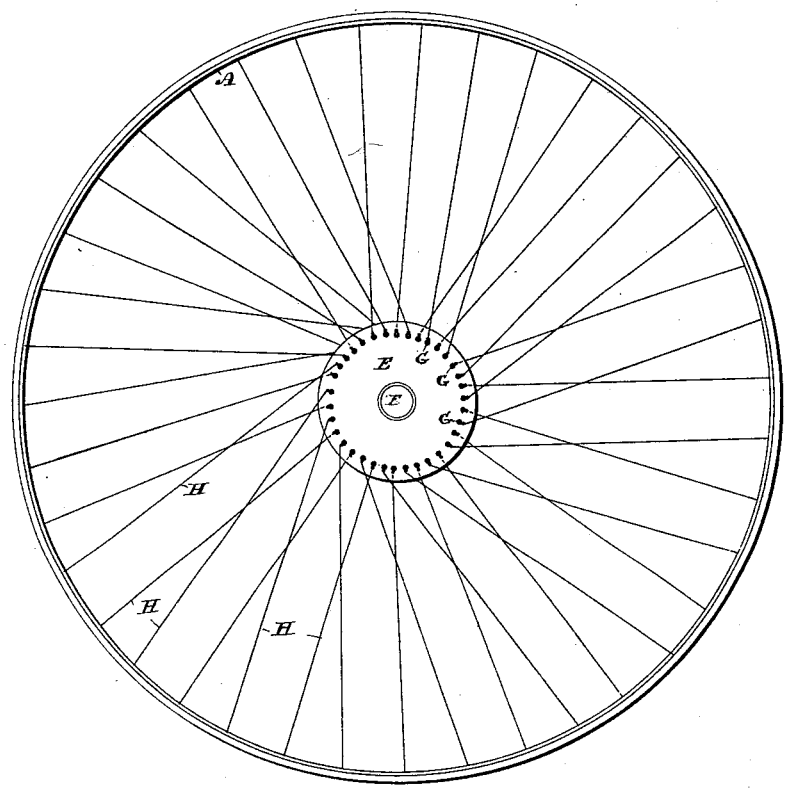

In the accompanying drawings, Figure 1 is a detached view, in transverse section, of a wheel-rim embodying my invention. Fig. 2 is a similar view showing the body portion and the tread of the rim detached from each other. Fig. 3 is a view in elevation, showing a portion of one of the hub-flanges and several of the spokes. Fig. 4 is a view showing such flange in section and two spokes and a part of the axle in side elevation. Fig. 5 is a view of the wheel in side elevation, showing a laced arrangement of the spokes; and Fig. 6 is a detached sectional view of means for adjustably securing the spokes to the rim.

As herein shown, the edges of the rolled sheet-metal body portion A of the rim are bent inward, then downward, then outward, and then upward to form hooks B B, opening upward. The edges of the tread of the rim C are bent upward, then inward, and then downward to form hooks D D, opening downward. The said tread is located between the side walls of the body portion of the rim and within the edges thereof, and has its bent edges embraced by the bent edges of the rim. When adjusted together, the edges of the two parts are rolled down.

My improved arrangement of the spokes is shown by Figs. 3, 4, and 5 of the drawings, in which, however, only one of the two flanges of the hub is shown. This flange E is rigidly secured to the wheel-axle F, and provided with a circular series of radial slots, G, formed near its edge and larger at their inner than at their outer ends. The independent spokes H each consists of a straight wire rod having its inner end provided with a headed hook, I, to adapt it to be engaged with the flange through one of the slots therein. The outer ends of the spokes are adapted to be secured to the wheel-rim by means enabling them to be adjusted and to be drawn to tension therefrom. For this purpose a nipple, J, such as shown by Fig. 6 of the drawings, may be employed, the spokes being threaded, as at K. In connecting the spokes with the flange they are alternately placed on its opposite faces and engaged with it by passing their headed hooks through the larger ends of its slots. They are then adjusted from their outer ends to draw their headed hooks into the outer and smaller ends of the slots by the means employed for connecting them with the wheel-rim. Fig. 5 of the drawings shows the spokes interwoven and laced.

It will be understood that while only one hub-flange is herein shown its mate is made as it is made and has the same arrangement of spokes.

Under the described arrangement of the spokes the individual spokes may be readily removed and replaced without in any way affecting the other spokes. It also enables them to be placed under very high tension, so as to secure rigidity in the wheel, and secures freedom from rattling, whether the spokes are interwoven or not; also, by arranging the spokes alternately on opposite sides of the flanges a most advantageous distribution of the strain is effected.

I would have it understood that I do not limit myself to the way herein shown of bending the edges of the body portion and the tread of the rim. It is obvious that the embracing of the edges of the tread by the edges of the body portion of the rim may be effected by bending the edges of the said body portion and tread in a variety of ways. I would therefore have it understood that I do not limit myself to the exact construction and arrangement of parts herein shown and described, but hold myself at liberty to make such changes and alterations as fairly fall within the spirit and scope of my invention.

I am aware that a wheel-rim having a tread located between its sides and within its edges is not broadly new, and that it is not new to bend the sides of a hollow rim over the virtually-straight edges of a curved tread supported by a stay located within the body of the rim. I am also aware that a movable hub-flange having a circular series of radial slots larger at their inner ends than at their outer ends, in combination with spokes having headed hooks at their inner ends, is not new, and that it is not broadly new to apply wire spokes to the opposite faces of the same hub-flange of a vehicle-wheel. I do not therefore claim these constructions, broadly; but What I do claim, and desire to secure by Letters Patent, is—

1. A wheel-rim composed of a body portion and a tread located between the same and below the edges thereof, each edge of the said body portion and each edge of the tread being bent at an angle to adapt their adjacent edges to be interlocked for supporting the tread, substantially as set forth.

2. A hollow wheel-rim composed of a body portion the edges whereof are bent inward to form hooks opening upward, and a tread located within such body portion and below the edges thereof, and having its edges bent to form hooks opening downward, which are embraced by those of the body portion, substantially as set forth.

3. In a vehicle-wheel, the combination, with an axle, of two slotted hub-flanges rigidly secured thereto, wire spokes having headed hooks at their inner ends and hooked in alternation into the opposite faces of each of the flanges through the slots thereof, and means for adjustably attaching the outer ends of the spokes to the wheel-rim, each spoke being entirely independent in its attachment to its flange from every other spoke, substantially as set forth.

In testimony whereof I have signed this specification in the presence of two subscribing witnesses.

ALBERT H. OVERMAN.

Witnesses:
A. C. BENTON,
E. J. BENTON.